UNITED STATES PATENT OFFICE.

SAMUEL PEACOCK, OF CHICAGO, ILLINOIS, ASSIGNOR TO E. I. DU PONT DE NEMOURS POWDER COMPANY, A CORPORATION OF NEW JERSEY.

COMPOUND OF ALUMINUM, CARBON, AND NITROGEN.

1,031,581.   Specification of Letters Patent.   Patented July 2, 1912.

No Drawing.   Application filed September 23, 1911. Serial No. 650,972.

*To all whom it may concern:*

Be it known that I, SAMUEL PEACOCK, a citizen of the United States, residing at Chicago, in the county of Cook and State of Illinois, have invented certain new and useful Improvements in Composition of Matter; and I do hereby declare the following to be a full, clear, and exact description of the invention, such as will enable others skilled in the art to which it appertains to make and use the same.

This invention relates to a composition of matter composed of aluminum, carbon and nitrogen having the formula $Al_2C_3N_6$.

This product may be produced as follows:—Finely divided alumina and carbon are thoroughly mixed in the proportions of 102 parts by weight of alumina to 72 parts of carbon, and the mixture is fed into a suitable furnace from which the air is excluded and into which nitrogen gas is continuously fed. The materials are employed in a dry condition, and in some cases I find it very desirable to employ an excess of carbon over that necessary to satisfy the equation below of from 25 to 30 per cent. in order to prevent the formation of an aluminum nitrid having the formula $Al_2N_2$. Further, such excess while insuring the formation of the first mentioned nitrid above, does not injuriously affect the process.

After the mixture and nitrogen are brought into the furnace from which all free oxygen is excluded, I preferably lower the pressure as by means of a pump to say 500 millimeters of mercury, which has the effect of causing the substances to react at about 1500° C. The said substances are next suitably heated by any suitable means until the reaction temperature is reached when the said first mentioned nitrid is produced according to the following equation:—

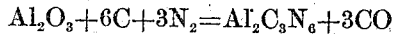
$$Al_2O_3 + 6C + 3N_2 = Al_2C_3N_6 + 3CO$$

all as is fully disclosed in my copending application Serial No. 650,973 filed Sept. 23, 1911 and entitled Process of producing compounds of aluminum, carbon and nitrogen.

The properties of this compound have not as yet been fully determined, but it is found to give off ammonia gas $NH_3$ when wet, and subjected to the action of steam in a closed vessel at about five atmospheres pressure.

A process of thus producing ammonia is claimed in my co-pending application #650,974, of even date herewith.

What I claim is:—

1. The herein described chemical compound containing aluminum, carbon and nitrogen and adapted to give off ammonia gas when subjected to steam at high pressures, substantially as described.

2. The herein described composition of matter containing only aluminum, carbon and nitrogen having the formula $Al_2C_3N_6$ and adapted to give off ammonia gas when subjected to steam at high pressures, substantially as described.

In testimony whereof I affix my signature in presence of two witnesses.

SAMUEL PEACOCK.

Witnesses:
T. A. WITHERSPOON,
GEO. B. PITTS.